United States Patent
Yildiz et al.

(10) Patent No.: US 10,345,902 B1
(45) Date of Patent: Jul. 9, 2019

(54) METHOD AND APPARATUS FOR MAINTAINING A SECURE HEAD-MOUNTED DISPLAY SESSION

(71) Applicant: Dell Products, LP, Round Rock, TX (US)

(72) Inventors: Yagiz C. Yildiz, Austin, TX (US); Lawrence E. Knepper, Leander, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 15/961,657

(22) Filed: Apr. 24, 2018

(51) Int. Cl.
- *G06F 3/01* (2006.01)
- *G06K 9/00* (2006.01)
- *G02B 27/00* (2006.01)
- *G02B 27/01* (2006.01)

(52) U.S. Cl.
CPC .......... *G06F 3/015* (2013.01); *G02B 27/0093* (2013.01); *G02B 27/0172* (2013.01); *G02B 27/0176* (2013.01); *G06K 9/00617* (2013.01)

(58) Field of Classification Search
CPC ............ G07C 9/00158; G07C 9/00087; G07C 9/00563; G07C 9/00071; G07C 9/00103; G07C 9/00571; G07C 9/00111; G07C 9/00134; G07C 2009/00095
USPC ....................................................... 340/5.52
See application file for complete search history.

(56) References Cited

U.S. PATENT DOCUMENTS

| | | | |
|---|---|---|---|
| 6,092,058 A | 7/2000 | Smyth | |
| 9,675,292 B2 * | 6/2017 | Fadem | ................. A61B 5/0002 |
| 9,798,144 B2 * | 10/2017 | Sako | ................... G02B 27/0172 |
| 2014/0159862 A1 | 6/2014 | Yang | |
| 2015/0058319 A1 * | 2/2015 | Miyajima | ............ G02B 27/017 707/722 |
| 2015/0313496 A1 | 11/2015 | Connor | |
| 2015/0338917 A1 | 11/2015 | Steiner | |
| 2016/0063561 A1 * | 3/2016 | MacNeille | ......... G06Q 30/0265 705/14.62 |
| 2016/0165220 A1 * | 6/2016 | Fujimaki | ................... G09G 3/36 348/49 |
| 2017/0010647 A1 | 1/2017 | Frank | |

* cited by examiner

*Primary Examiner* — Mark S Blouin
(74) *Attorney, Agent, or Firm* — Prol Intellectual Property Law, PLLC; H. Kenneth Prol (57) ABSTRACT

A method of routing the display of secure content to a head mounted display device via a host information handling system may comprise receiving, via a processor, a request to initiate a new user session from a user, measuring, via a brain wave detection controller, a brain wave pattern signal across a plurality of brain wave detection sensors mounted with a head mounted display device, if the brain wave pattern signal is identified as a brain wave pattern, prompting the user for valid user credentials, receiving, via the processor, user credentials from the user, and if the user credentials match credential records stored in a memory associated with an authenticated user, granting the user access to the head mounted display device.

20 Claims, 6 Drawing Sheets

METHOD AND APPARATUS FOR MAINTAINING A SECURE HEAD-MOUNTED DISPLAY SESSION

FIELD OF THE DISCLOSURE

The present disclosure generally relates to head mounted displays for information handling systems. The present disclosure more specifically relates to maintaining a secure session via a head mounted display device in an augmented user interface.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a head mounted user interface and/or display. A head mounted user interface may include an augmented reality display system, a virtual reality system, mixed systems, extended display systems or any headset implementations.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Data security is critical for most businesses and even home computer users. Confidential and/or private information such as client information, payment information, personal files, and bank account details can be potentially dangerous if it falls into the wrong hands. Such sensitive information may be viewed in embodiments of the present disclosure on a head mounted display device wearable by the user. Head mounted display devices, wearable around the user's head and/or eyes and having the capability of reflecting projected images as well as allowing the user to see through it may be used with augmented or virtual reality display systems. Head mounted display devices may include augmented reality devices, virtual reality devices, mixed reality headset devices, extended reality headset devices, or any headset implementations of all or part of an information handling system.

Current solutions for securing user sessions initiated via a head mounted display device include initial authentication measures undertaken prior to allowing the user access. Examples of such initial authentication measures may include entry of a password (e.g. by voice command or keyed entry), iris scanning, retinal scanning, and fingerprint scanning. Each of these methods may be employed to ensure a user attempting to initiate a user session is authorized to do so, but may not protect against unauthorized viewers accessing the sensitive information via the head mounted display after the user session has been initiated. For example, an authorized user may initiate a new user session via the head mounted display device and later remove the device without ending the session, allowing an unauthorized user to don the device and access information, potentially including sensitive information. As another example, an unauthorized user may remotely access one or more security input devices (e.g. retinal scanner, iris scanner, fingerprint scanner, voice recognition device) and provide false initial authentication to start a new user session as part of a spoof attack. In such a scenario, the unauthorized remote user may not even be in physical proximity to the head mounted display device.

Embodiments of the present disclosure address these security issues via a head-mounted display secure session maintenance system operating to allow initial user access to the head mounted display device only when it is determined a user is wearing the head mounted display device. The head-mounted display secure session maintenance system in embodiments of the present disclosure may include a plurality of brainwave detection sensors mounted on the head mounted display device such that the plurality of brainwave detection sensors come into physical contact with the user's skin when the head mounted display device is donned by the user. The plurality of brainwave detection sensors in embodiments may operate in concert to detect the presence or absence of a user's brainwave patterns, in much the same way electrodes in an electroencephalogram (EEG) record brainwave patterns. A brainwave detection controller within the head-mounted display secure session maintenance system in embodiments herein may measure fluctuations in voltage across the plurality of brainwave detection sensors when brainwave patterns are present, and a lack of voltage or a lack of fluctuations in voltage when brainwave patterns are not present.

Upon initiation of a user session in embodiments of the present disclosure, the central processing unit (CPU) of the head mounted display device may prompt the brainwave detection controller to determine whether the plurality of brainwave sensors mounted within the head mounted display device detect a brainwave pattern. If the brainwave detection controller in embodiments herein detects brainwave patterns are present, it may transmit an indication to a CPU of the head mounted display device that a user is present and has donned the head mounted display device. In such embodiments, the CPU may then prompt the user for further authenticating input, such as a voice sample for recognition, entry of a password, a retinal scan, an iris scan, or a fingerprint scan. In other embodiments, the CPU may prompt the user for such authenticating input prior to prompting the brainwave detection controller to determine whether the plurality of brainwave sensors detect a brainwave pattern. The CPU in embodiments of the present disclosure may initiate the new user session as requested only when the brainwave detection controller has detected a present brainwave pattern, and the user has provided authenticating input.

If the brainwave detection controller in embodiments herein detects brainwave patterns are not present, it may transmit an indication to the CPU of the head mounted display device that the head mounted display device has not been donned by a user. In such embodiments, the CPU may disallow initiation of the user session. In such a way, the head-mounted display secure session maintenance system may ensure user sessions are only initiated when the user has provided authentication, and when it has been determined that the head mounted display device has been donned by a user. Thus, the head-mounted display secure session maintenance system may secure against remote access of the head mounted display device during a spoof attack when the head mounted display device has not been donned by a user.

The head-mounted display secure session maintenance system in embodiments of the present disclosure may further protect against an unauthorized user donning the head mounted display device after an authorized user has initiated a user session but removed the head mounted display device. The brainwave detection controller in embodiment herein may measure the voltage across the plurality of the brainwave detection sensors at routine intervals in order to detect when a user has doffed the head mounted display device. If the brainwave detection controller in embodiments herein detects a lack of brainwave patterns during one of these routine measurements, it may transmit a message to the CPU of the head mounted display device, which may respond by ending the user session. In such a way, the head-mounted display secure session maintenance system in embodiments of the present disclosure may protect against unauthorized users accessing secure information via the head mounted display device during a previously initiated secure user session.

In one embodiment, the head-mounted display secure session maintenance system is software code executable on one or more application processors, which may reside at the head mounted display device, at one or more remote servers and data base systems or may reside across a combination of any of these locations. In other embodiments, some or all of the head-mounted display secure session maintenance system may include firmware executed via processors or controller or may be hardcoded as an applied specific integrated circuit (ASIC) or other circuit to execute some or all of the operations described in the disclosure herein.

Figure 1:
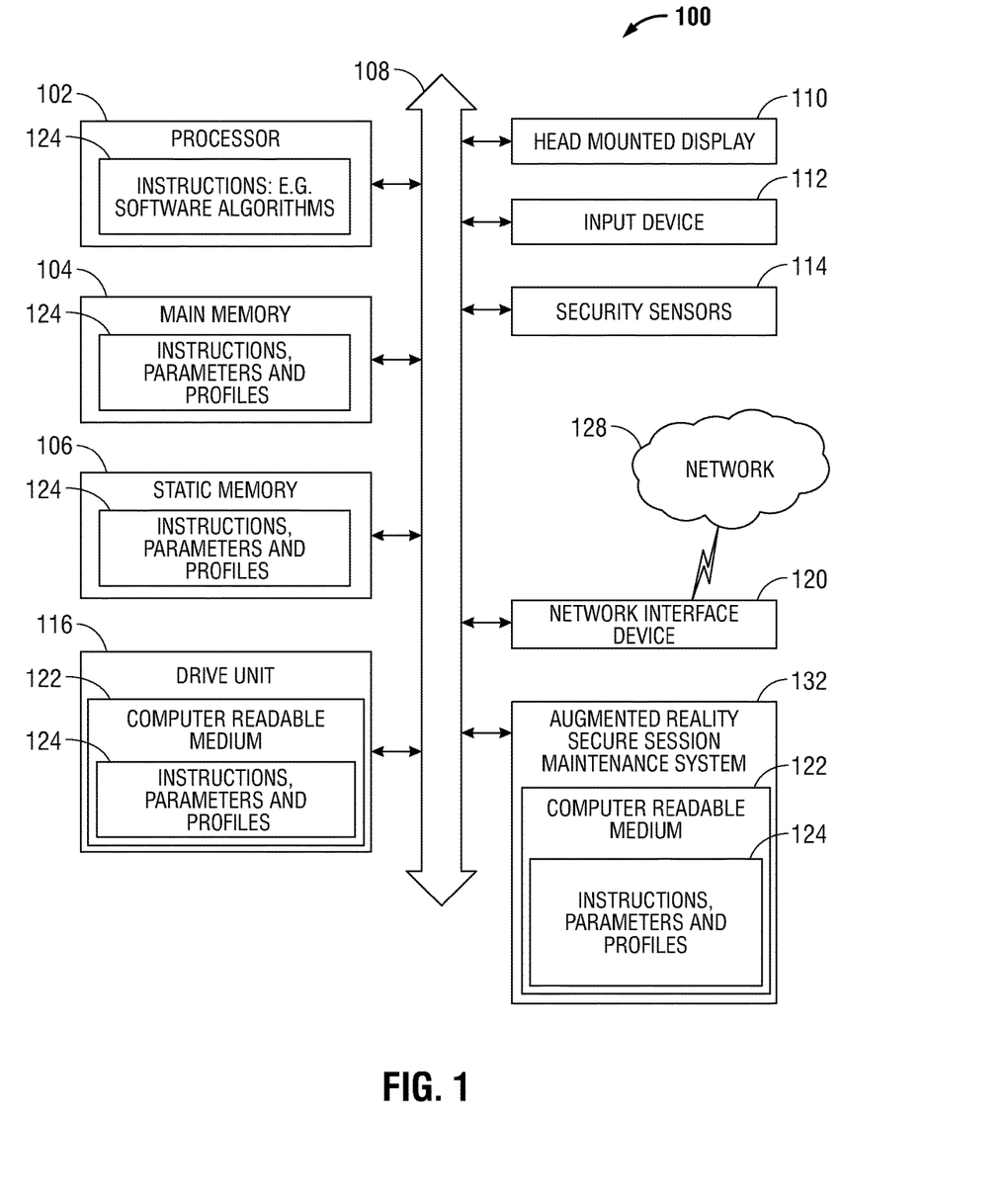
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the head-mounted display secure session maintenance system 132, and drive unit 116 (volatile (e.g. random-access memory, etc.), non-volatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a head mounted display 110, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display may use any method that reflects projected images in order to create a head-mounted display. Additionally, the information handling system 100 may include an input device 112, such as a keyboard, and/or a cursor control device, such as a mouse, touchpad, or gesture or touch screen input. The information handling system 100 may also include one or more security sensors 114, such as, for example, a microphone used for voice recognition, an iris scanner, a retina scanner, and/or a fingerprint scanner. The information handling system 100 can also include a disk drive unit 116.

The information handling system 100 may also include a head-mounted display secure session maintenance system 132 that may be operably connected to the bus 108. The head-mounted display secure session maintenance system 132 computer readable medium 122 may also contain space for data storage. The head-mounted display secure session maintenance system 132 may perform tasks related to allowing user's access to the information handling system 100 only after the user has been authenticated as authorized to do so, and only when a plurality of brainwave detection sensors mounted within a wearable headset detect the presence of brainwaves.

In an embodiment, the head-mounted display secure session maintenance system 132 may communicate with the main memory 104, the processor 102, the alpha-numeric input device 112, head mounted display 110, and the network interface device 120 via bus 108, and several forms of communication may be used, including ACPI, SMBus, a 24 MHZ BFSK-coded transmission channel, or shared memory.

The network interface device 120 shown may be a wireless adapter which can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may also provide connectivity via Bluetooth to a nearby information handling system, such as a desktop or laptop information handling system, or to a tablet or mobile device. The network interface device 120 may have various components central to and peripheral to a wireless adapter including controllers, radios, radiofrequency front end systems and the like that operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. To communicate among devices such as information handling systems, head mounted display devices, or other devices wirelessly connectable to one or more information handling systems WPAN, Bluetooth or other protocols may be used via a wireless adapter and network interface device 120.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may execute an head-mounted display secure session maintenance system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the head-mounted display secure session maintenance system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the head-mounted display secure session maintenance system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the head-mounted display secure session maintenance system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The head-mounted display secure session maintenance system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
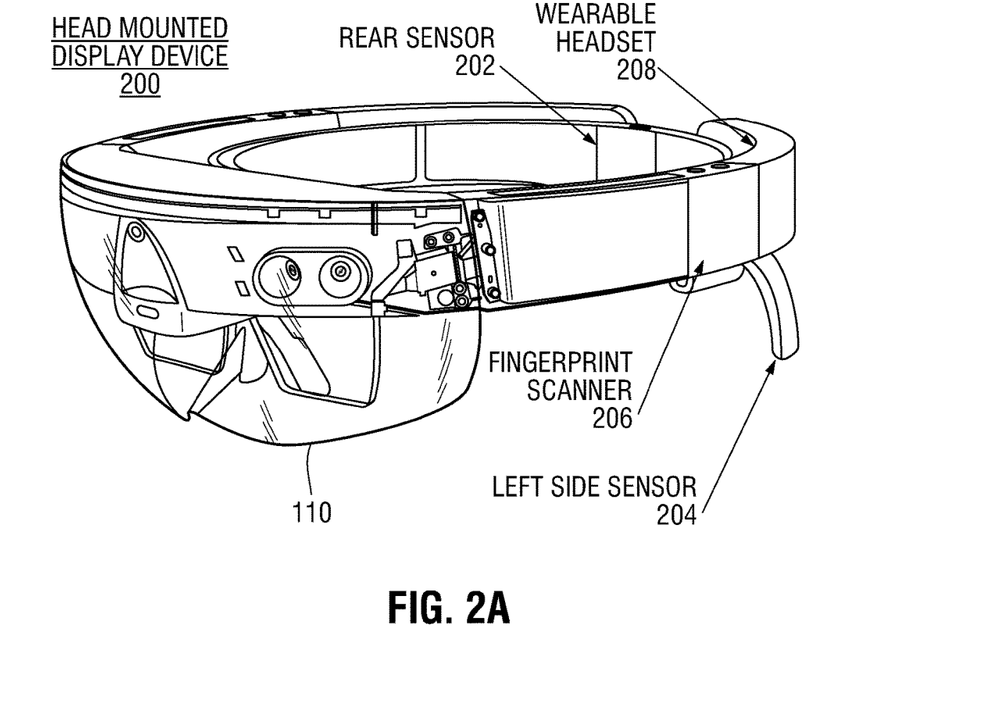
FIG. 2A is a graphical illustration of a left-side view of a head mounted display device according to an embodiment of the present disclosure.

FIG. 2A is a graphical illustration of a left-side view of a head mounted display device including brainwave detection sensors according to an embodiment of the present disclosure. Head mounted display devices, wearable around the user's head and/or eyes and having the capability of reflecting projected images as well as allowing the user to see through it may be used with augmented or virtual reality display systems in an embodiment. For example, a head mounted display device 200 may include a wearable headset 208, wearable around the user's head, and a head mounted display 110 wearable around the user's eyes. The head mounted display 110 in an embodiment may be capable of reflecting projected three-dimensional images generated by a head mounted display device optics engine, as described herein. In some embodiments, the head mounted display 110 may also be capable of displaying two-dimensional images. A fingerprint scanner 206 may be mounted within the wearable headset 208. Such a fingerprint scanner 206 in an embodiment may be used to authenticate a user wearing the head mounted display device 200 upon initiation of a new user session.

A plurality of brainwave detection sensors may be mounted within the wearable headset 208 in an embodiment. Each brainwave detection sensor in an embodiment may be an electrode operably connected to a brainwave detection controller. When placed against the scalp, or in close proximity to the scalp of a user, ionic current within the neurons of the user's brain may cause a difference in voltages between two or more such electrodes. A measured difference in voltages across the plurality of brainwave detection sensors in embodiments described herein may be equivalent to the difference between the maximum voltage detected across all such sensors and the minimum voltage detected across all such sensors. Such a difference in voltages, or fluctuations in differences in voltages between two or more such electrodes may indicate a brainwave signal that indicates the presence of the user's brainwaves based on the signal patterns detected. A lack of both fluctuations in voltages between the electrodes and a difference in voltages between the electrodes in an embodiment may signify an absence of brainwave patterns in the measured signals, indicating the head mounted display device 200 has not been donned by a user. A minimum difference in voltage, or voltage difference threshold needed in embodiments described herein to determine the presence of brainwaves within the measured brainwave signals may be preset prior to initiation of a new user session and may range anywhere from 5 microvolts to 100 microvolts in some example embodiments. Threshold voltage difference levels may vary depending on implementation and sensitivity of electrodes and the like. It is understood any range may be applied depending on the detection system utilized with embodiments of the present disclosure.

In an example embodiment, a rear sensor 202 may be mounted at the rear interior of the wearable headset 208 such that it comes into contact with a user's scalp when the user dons the wearable headset 208. As another example, left side sensor 204 may be mounted on the left interior side of the wearable headset 208 such that it also comes into contact with a user's scalp when the user dons the wearable headset 208. In some embodiments, the left side sensor 204 may be mounted such that it comes into contact with the user's skin behind the user's left ear when the user dons the wearable headset 208.

In some embodiments, the head-mounted display secure session maintenance system may operate to detect the presence of specific types of brainwaves that are inherent in all measured brainwave activity. That is to say, measured brainwave signals may be compared to brainwave patterns which may indicate presence of particular types of brainwave patters or wave rhythm types indicated that the measured signals are indeed brainwaves having recognizable patterns. It is not necessary to conduct an analysis of brainwaves that may be specific to an individual or may identify an individual since those may be in flux with brain activity. Rather, the presence of brainwave patterns in the measured brainwave signals according to embodiments herein may be used to verify continued wearing and operation of the head mounted display device by a user who was granted authenticated access via another authentication process. Brainwaves are the fluctuations in voltages across at least three brainwave sensors over a period of time, resulting in a sinusoidal signal. The brainwave pattern sensors in an embodiment may be capable of detecting the four types of simple brainwave periodic rhythms typically identified in EEGs, including alpha, beta, delta, and theta. Alpha brainwaves in an embodiment may have a typical frequency range between 8 and 13 Hz and an amplitude range between 20 and 200 microvolts. Beta brainwaves in an embodiment may have a typical frequency range between 13 and 30 Hz and an amplitude range between 5 and 10 microvolts. Delta brainwaves may have a typical frequency range between 1 and 5 Hz and an amplitude range between 20 and 200 microvolts. Theta brainwaves may have a typical frequency range between 4 and 8 Hz and an amplitude range around 10 microvolts. The alpha, delta, and theta brainwave patterns typically only occur in adults in a resting or sleeping state, or when the eyes are closed. In contrast, beta brainwave patterns typically only occur in adults who are alert and attentive to external stimuli. Thus, an adult intentionally interacting with the headset 208 should be exhibiting beta brainwave patterns. In some embodiments, the head-mounted display secure session maintenance system may only allow access to the headset user information system upon the detection of beta brainwave patterns. Further, these brainwave patterns may be difficult to reproduce artificially from a remote source, thus making attempts at remote spoofing difficult.

In such an embodiment, the head-mounted display secure session maintenance system may record the fluctuations in voltage across at least three of the brainwave pattern sensors. One of the brainwave pattern sensors may operate as a point of reference or "ground," which identifies the body's baseline voltage due to electrical activities outside the brain, but within the body. For example, the left side sensor 204 may operate as such a "ground" or reference electrode. The head-mounted display secure session maintenance system may detect voltage potential across the rear sensor 202 and a third sensor in such an embodiment over time, in order to identify the presence of specific types of the user's brainwave patterns.

Figure 2B:
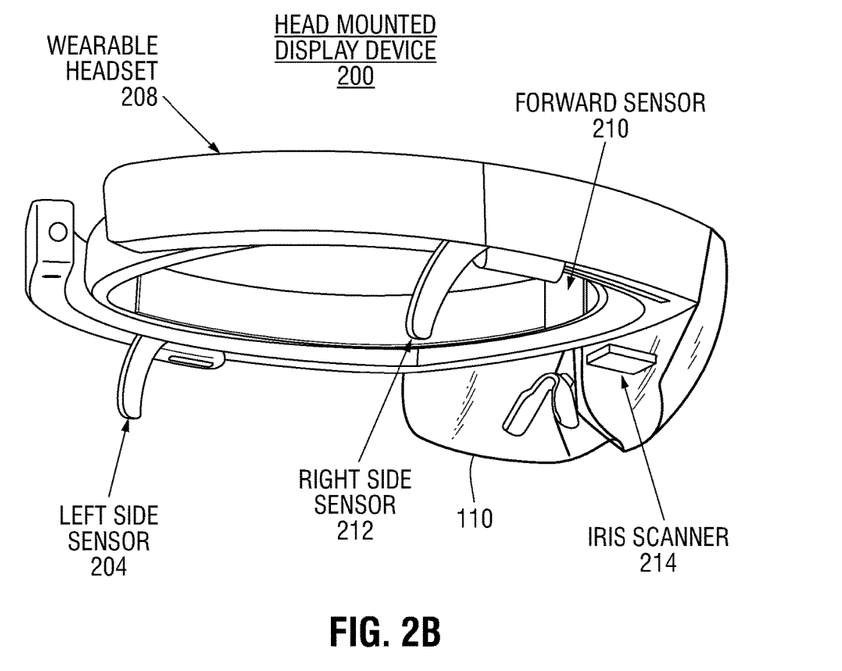
FIG. 2B is a graphical illustration of a right-side view of a head mounted display device according to an embodiment of the present disclosure.

FIG. 2B is a graphical illustration of a right-side view of a head mounted display device including brainwave detection sensors according to an embodiment of the present disclosure. The head mounted display 110 wearable around the user's eyes in an embodiment may be co-located with an iris scanner 214 capable of scanning the user's iris or retina when the user dons the wearable headset 208. Such an iris or retina scan in an embodiment may be used to authenticate a user wearing the head mounted display device 200 at the initiation of a new user session.

In an example embodiment, a forward sensor 210 may be mounted at the front interior of the wearable headset 208 such that it comes into contact with a user's scalp when the user dons the wearable headset 208. As another example, right side sensor 212 may be mounted on the right interior side of the wearable headset 208 such that it also comes into contact with a user's scalp when the user dons the wearable headset 208. In some embodiments, the right side sensor 212 may be mounted such that it comes into contact with the user's skin behind the user's right ear when the user dons the wearable headset 208. The presence of brainwave patterns in an embodiment may be indicated by a measured difference in voltage between any two of the forward sensor 210, rear sensor, left-side sensor 204, and/or right-side sensor 212. In other embodiments, the left-side sensor 204 or the right-side sensor 212 may operate as a "ground" or reference electrode, and the presence of brainwave patterns may be identified by a measured potential over time between the rear sensor and the forward sensor 210. The presence of brainwave patterns in an embodiment may also be indicated by a measured fluctuation in voltages between any two of the forward sensor 210, rear sensor, left-side sensor 204, and/or right-side sensor 212.

Figure 3:
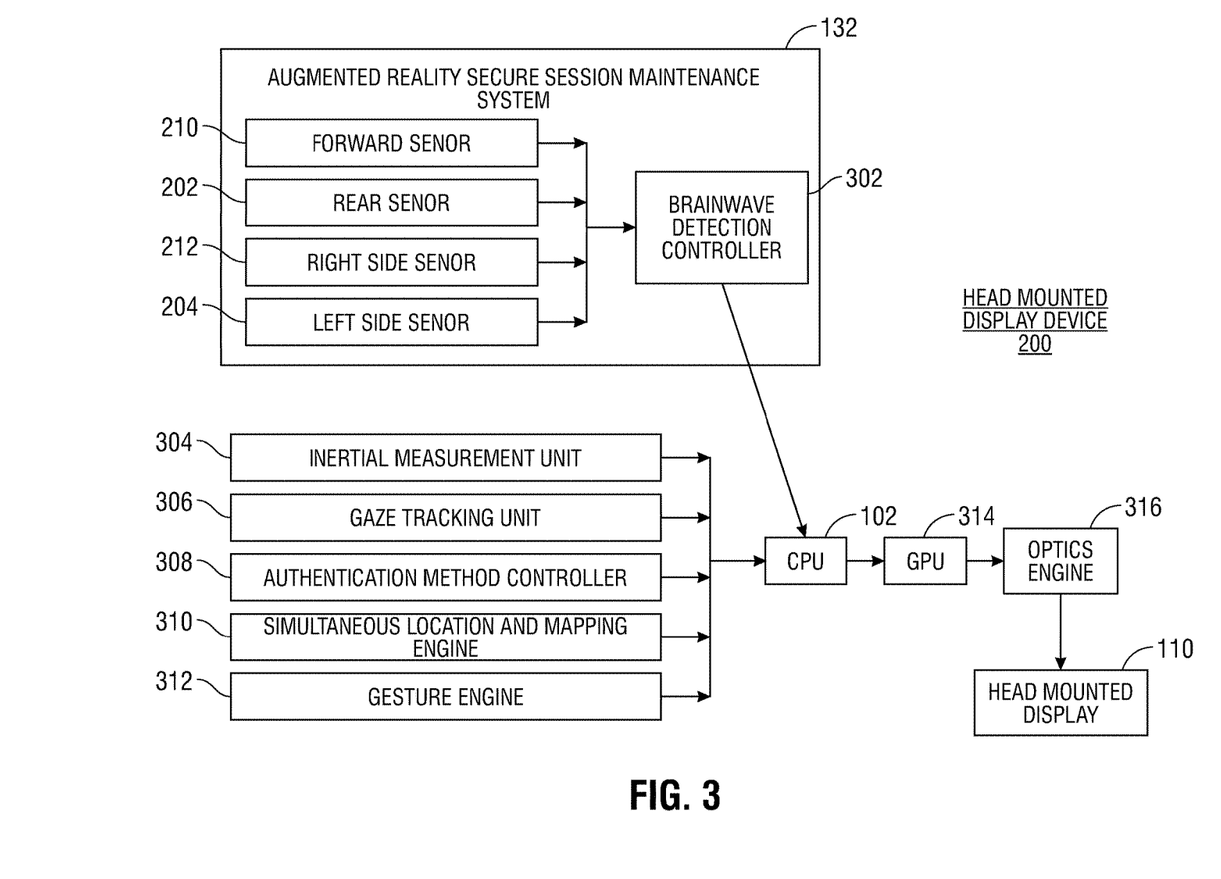
FIG. 3 is a block diagram of a head mounted display device according to an embodiment of the present disclosure.

FIG. 3 is a block diagram of a head mounted display device including an head-mounted display secure session maintenance system according to an embodiment of the present disclosure. The head mounted display device 200 in an embodiment may include a CPU 102 operably connected to the head-mounted display secure session maintenance system 132 and a graphics processing unit (GPU) 314. The GPU 314 in an embodiment may operate to generate three-dimensional primitives within a virtual three-dimensional environment of digital content to be displayed within the head mounted display 110. An optics engine 316 of the head mounted display device 200 may render three-dimensional images of the digital content onto such three-dimensional primitives in an embodiment. The rendered three-dimensional images may then be displayed in an embodiment by the head mounted display 110 using, for example, a curved mirror based reflection, a waveguide based method or a light guide based method. Waveguide methods may further include, but may not be limited to diffraction optics, holographic optics, polarized optics, and reflective optics.

The CPU 102 of the head mounted display device 200 in an embodiment may further communicate with the head-mounted display secure session maintenance system 132 in order to determine whether a user's brainwave patterns have been detected by a plurality of sensors within a wearable headset of the head mounted display device. The head-mounted display secure session maintenance system 132 in an embodiment may include a plurality of sensors mounted within the wearable headset, including, but not limited to a forward sensor 210, a rear sensor 202, a right side sensor 212, and a left side sensor 204. Other embodiments may include other sensors, located in various positions around the user's scalp. Each brainwave detection sensor (e.g. 202, 204, 210, and 212) in an embodiment may be an electrode operably connected to a brainwave detection controller 302. When placed against the scalp, or in close proximity to the scalp of a user, ionic current within the neurons of the user's brain may cause a difference in voltages between two or more such electrodes.

Such a difference in voltages, or fluctuations in differences in voltages between two or more such electrodes (e.g. 202, 204, 210, and 212), as measured by the brainwave detection controller 302 in an embodiment, may indicate the presence of the user's brainwaves. If the brainwave detection controller 302 in an embodiment detects such a difference in voltages, or fluctuations in voltages representative of beta brainwaves, it may transmit an indication to the CPU 102 that brainwave patterns have been detected. The CPU 102 in such an embodiment may then allow for the initiation of a new user session, and direct the GPU 314, optics engine 316, and head mounted display 110 to display information via the head mounted display 110 if the user has also provided other forms of valid authentication.

A lack of both fluctuations in voltages between the electrodes and a difference in voltages between the electrodes (e.g. 202, 204, 210, and 212), as measured by the brainwave detection controller 302 in an embodiment, may signify an absence of brainwave patterns, indicating the head mounted display device 200 has not been donned by a user. If the brainwave detection controller 302 in an embodiment does not detect such a difference in voltages, or fluctuations in voltages, it may transmit an indication to the CPU 102 that brainwave patterns have not been detected. The CPU 102 in such an embodiment may then disallow for the initiation of a new user session, and disallow the display of information via the head mounted display 110, regardless of whether the user has also provided other forms of valid authentication.

Detection of fluctuations in voltages between the electrodes indicative of alpha, delta, or theta brainwaves, as measured by the brainwave detection controller 302 in an embodiment may signify that the use has donned the head mounted display device 200 but is not in an alert or wakeful state, and thus not attempting to interface with the head mounted display device 200. If the brainwave detection controller 302 in an embodiment detects alpha, delta, or theta brainwave patterns, it may transmit an indication to the CPU 102 that beta brainwave patterns have not been detected. The CPU 102 in such an embodiment may then disallow for the initiation of a new user session, and disallow the display of information via the head mounted display 110, regardless of whether the user has also provided other forms of valid authentication.

In another embodiment, the brainwave detection controller 302 may measure the voltages across the plurality of brainwave detection sensors (e.g. 202, 204, 210, and 212) continuously, or at routine intervals in order to detect when a user has doffed the head mounted display device 200. After the CPU 102 has initiated a new user session in such an embodiment, if the brainwave detection controller 302 detects a lack of brainwave patterns at one of these routine intervals, it may transmit an indication to the CPU 102 that brainwave patterns have ceased to be detected. The CPU 102 in such an embodiment may then end the user session, and disallow the further display of information via the head mounted display 110.

In some embodiments, once a user session has been initiated, the brainwave detection controller 302 may continuously monitor the user's brainwave patterns, and upon detecting a brainwave pattern other than beta (e.g. alpha, delta, or theta), the brainwave detection controller 302 may transmit an indication to the CPU 102 that beta brainwave patterns have ceased to be detected. The CPU 102 in such embodiments may discontinue the present user session, and disallow continued display of information via the head mounted display 110.

The CPU 102 of the head mounted display device 200 in an embodiment may be further operably connected to other sensors, engines, and controllers, including but not limited to the inertial measurement unit 304, a gaze tracking unit 306, an authentication method controller 308, a simultaneous location and mapping engine 310, and a gesture engine 312. The inertial measurement unit 304 in an embodiment may operate to identify a position, velocity, acceleration, or orientation of the head mounted display device 200. Such identification may record the user's movement within her physical surroundings such that the same movement may be mimicked in a virtual reality displayed via the head mounted display 110. The gaze tracking unit 306 in an embodiment may operate to determine a location in space at which the user is focusing her eyes/gaze. Such input may be used to identify a point or object of interest in the three-dimensional images projected by the head mounted display 110, and in some embodiments, as part of a user input mechanism whereby the user inputs commands based on her gaze.

The authentication method controller 308 in an embodiment may operate to receive input from one or more security sensors in order to verify whether a user is authorized to initiate a requested user session. For example, the authentication method controller 308 may receive input from sensors including, but not limited to, a microphone, a keyboard or other manual input device, a retinal scanner, an iris scanner, or a fingerprint scanner. The authentication method controller 308 may compare received inputs from the keyboard or other manual input device against usernames and/or passwords in an embodiment. In other aspects, the authentication method controller 308 may analyze voice recordings received from a microphone with a voice recognition software to determine if the voice recorded matches the voice of an authorized user. In yet other aspects, the authentication method controller 308 may compare received retinal scans, iris scans, and/or fingerprint scans against stored scans to determine whether the received scans match those stored in a memory for an authorized user. If the authentication method controller 308 in an embodiment determines the received inputs indicate the user requesting initiation of the user session is a valid and authorized user, it may transmit an instruction to the CPU 102 to allow for initiation of the requested user session.

The simultaneous location and mapping (SLAM) engine 310 in an embodiment may operate to detect the user's location within her physical environment while simultaneously mapping the physical environment. The SLAM engine 310 may be used, for example, in an embodiment in which three-dimensional images are projected through a semi-transparent head mounted display 110 as part of an augmented virtual reality in such a way that the user can interact with both the three-dimensional images projected through the head mounted display 110 and other physical objects in her physical environment. The gesture engine 312 may operate to process three-dimensional images taken of the user's hands and/or feet, as viewed from the head mounted display 110. The gesture engine 312 may identify one or more gestures associated with command instructions within such processed three-dimensional images in embodiments in which user input may be transmitted via gesture command.

Figure 4:
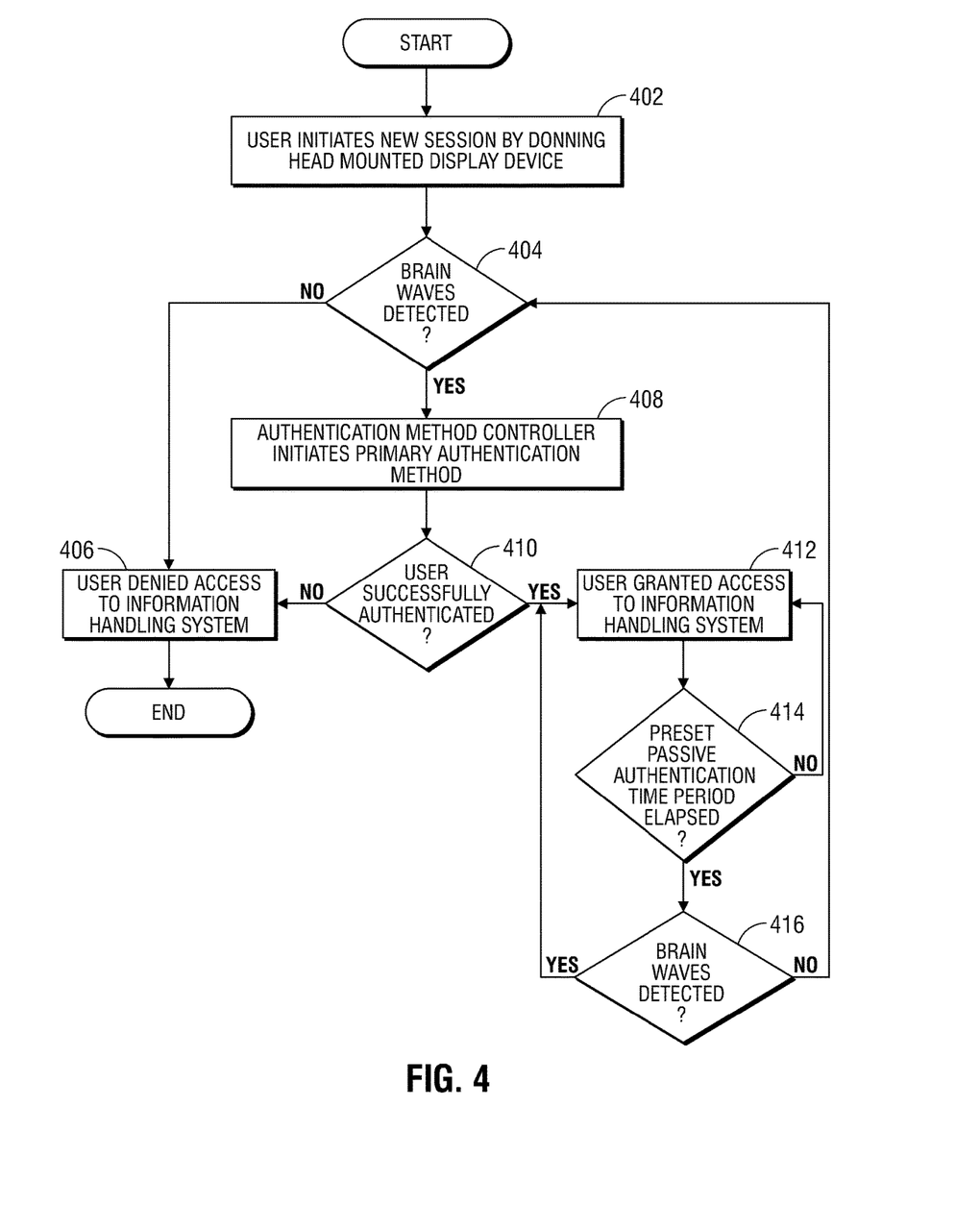
FIG. 4 is a flow diagram of a method for initiation of a new user session when brainwave patterns are detected according to an embodiment of the present disclosure.

FIG. 4 is a flow diagram of a method for initiation of a new user session for a valid and authorized user when brainwave patterns are detected according to an embodiment of the present disclosure. At block 402, in an embodiment, a user may initiate a new session by donning a head mounted display device. As described herein, the head mounted display device may include a plurality of brainwave detection sensors mounted within a wearable headset such that the plurality of brainwave detection sensors comes into close proximity or contact with a user's scalp or skin when the user dons the wearable headset. For example, as described in an embodiment with reference to FIG. 2A, the head mounted display device 200 may include a rear sensor 202 and a left side sensor 204 mounted within the interior of a wearable headset 208 such that the rear sensor 202 and left side sensor 204 come into close proximity or contact with the user's scalp or skin when the user dons the wearable headset 208. As another example, as described in an embodiment with reference to FIG. 2B, the head mounted display device 200 may include a forward sensor 210 and a right side sensor 212 mounted within the interior of a wearable headset 208 such that the forward sensor 210 and right side sensor 212 come into close proximity or contact with the user's scalp or skin when the user dons the wearable headset 208. Upon donning the head mounted display device in an embodiment, the user may attempt to initiate a user session.

In some embodiments, the user may not directly attempt to initiate a user session. In such embodiments, the identification of brainwave patterns by the plurality of brainwave sensors may be interpreted as an attempt to initiate a user session. In such a way, the user donning the headset may prompt the head-mounted display secure session maintenance system to initiate a new user session. In yet other embodiments, the user pressing the power button on the head mounted display may initiate a new user session.

In some embodiments, a user may attempt to initiate a new user session via the head mounted display device without donning the head mounted display device. This may occur, for example, if a remote user is attempting to gain unauthorized access to the head mounted display device in a spoof attack. The head-mounted display secure session maintenance system in embodiments of the present disclosure may operate to protect against such an unauthorized remote access by disallowing access to the head mounted display device when brain waves are not detected at the wearable headset, or when beta brainwaves are not detected at the wearable headset.

It may be determined whether brain waves are detected at block 404 in an embodiment. The CPU of the head mounted display device in an embodiment may operate to grant or deny initiation of a new user session. The CPU of the head mounted display device may communicate with the head-mounted display secure session maintenance system in an embodiment in order to determine whether a user's brainwave patterns have been detected by the plurality of sensors within a wearable headset of the head mounted display device. Each brainwave detection sensor in an embodiment may be an electrode operably connected to a brainwave detection controller. When placed against the scalp, or in close proximity to the scalp of a user, ionic current within the neurons of the user's brain may cause a difference in voltages between two or more such electrodes. In some embodiments, at least three electrodes may be required in order to detect such voltage differences, with one of the electrodes operating as a "ground" or reference electrode.

Such a difference in voltages, or fluctuations in differences in voltages between two or more such electrodes, as measured by the brainwave detection controller in an embodiment, may indicate the presence and/or type of the user's brainwaves. A lack of both fluctuations in voltages between the electrodes and a difference in voltages between the electrodes, as measured by the brainwave detection controller in an embodiment, may signify an absence of brainwave patterns, indicating the head mounted display device has not been donned by a user. If the brainwave detection controller in an embodiment does not detect such a difference in voltages, or fluctuations in voltages, it may transmit an indication to the CPU that brainwave patterns have not been detected, and the method may proceed to block 406. If the brainwave detection controller in an embodiment detects such a difference in voltages, or fluctuations in voltages, it may transmit an indication to the CPU that brainwave patterns have been detected, and the method may proceed to block 408.

In another embodiment, if the brainwave detection controller detects alpha, delta, or theta brainwave patterns, it may transmit an indication to the CPU that beta brainwave patterns have not been detected. Detection of fluctuations in voltages between the electrodes indicative of alpha, delta, or theta brainwaves, as measured by the brainwave detection controller in such an embodiment may signify that the use has donned the head mounted display device but is not in an alert or wakeful state, and thus not attempting to interface with the head mounted display device. The method may then proceed to block 408 in such an embodiment.

At block 406, in an embodiment in which the CPU has received an indication from the brainwave detection controller that brainwave patterns have not been detected at the wearable headset, or that beta brainwave patterns have not been detected at the wearable headset, the CPU may deny access to the information handling system of the head mounted display device. For example, in an embodiment described with reference to FIG. 3, the CPU 102 in such an embodiment may disallow for the initiation of a new user session, and disallow the display of information via the head mounted display 110, regardless of whether the user has also provided other forms of valid authentication. The method may then end. In such a way, the head-mounted display secure session maintenance system may protect against remote users gaining unauthorized access to secure information via the head mounted display device.

At block 408, in an embodiment in which the CPU has received an indication from the brainwave detection controller that brainwave patterns have been detected at the wearable headset, or that beta brainwave patterns have been detected at the wearable headset, the CPU may initiate a primary authentication method to determine whether the user is an authorized user. For example, the CPU may prompt an authentication method controller in an embodiment to receive one or more security inputs from the user in order to determine if the user is an authorized user. Primary authentication methods may include the user providing a correct password and username combination, an authorized fingerprint, an authorized retinal scan, an authorized iris scan, or an authorized voice sample. Other embodiments may include other types of identification for conventional desktop or laptop information handling systems, tablet information handling systems, and/or mobile information handling systems, such as smart phones.

It may be determined at block 410 whether the user requesting initiation of the user session has been authenticated in an embodiment. For example, an authentication method controller in an embodiment may operate to receive input from one or more security sensors in order to verify whether a user is authorized to initiate a requested user session. Such security sensors may include, but may not be limited to, a microphone, a keyboard or other manual input device, a retinal scanner, an iris scanner, or a fingerprint scanner. The authentication method controller may compare received inputs from the keyboard or other manual input device against usernames and/or passwords, analyze voice recordings received from a microphone with a voice recognition software, and/or compare received retinal scans, iris scans, and/or fingerprint scans against stored scans to determine whether the received scans match those stored in a memory for an authorized user. If the authentication method controller in an embodiment determines the received inputs indicate the user requesting initiation of the user session is a valid and authorized user, the method may proceed to block 412. If the authentication method controller in an embodiment determines the received inputs indicate the user requesting initiation of the user session is not a valid and authorized user, the method may proceed to block 406, and the CPU may deny the user access to the information handling system of the head mounted display device. The method may then end. In such a way, the head-mounted display secure session maintenance system in an embodiment may ensure the initiation of a new user session only occurs when an authorized user dons the head mounted display device.

At block 412, in an embodiment in which the authentication method controller determines the received inputs indicate the user requesting initiation of the user session is a valid and authorized user, the user may be granted access to the information handling system of the head mounted display device. For example, in an embodiment, following successful user authentication, the authentication method controller may transmit an instruction to the CPU to allow for initiation of the requested user session. Such an instruction from the authentication method controller, in combination with an indication received from the brainwave detection controller that brainwaves have been detected at the head mounted display device may indicate the presence of a valid, authenticated user. The CPU in such an embodiment may then initiate a new user session, and direct the GPU, optics engine, and head mounted display of the head mounted display device to display information via the head mounted display.

In some embodiments, the method may then end. In other embodiments, the brainwave detection controller may measure the voltages across the plurality of brainwave detection sensors continuously or at routine intervals in order to detect when a user has doffed the head mounted display device, or when the user's brainwave patterns shift away from beta patterns. The brainwave detection controller in an embodiment may be notified when a user session has been initiated, and begin a countdown timer of a preset length of time. For example, the brainwave detection controller in an embodiment may initiate a countdown timer equivalent to a preset passive authentication time period in an embodiment upon notification of initiation of a new user session. In other embodiments, the brainwave detection controller may continuously monitor the user's brainwave patterns upon initiation of a new user session.

At block 414, in an embodiment, it may be determined whether such a preset passive authentication time period has elapsed. The preset passive authentication time period in an embodiment may be set prior to initiation of any new user session, and may be equivalent to any length of time, such as, for example, two minutes, five minutes, ten minutes, thirty minutes, or one hour. The preset passive authentication time period in an embodiment may be set with a factory default, may be set by individual users within a user settings interface, or may be set by an IT professional according to a user setting policy applied to several head mounted display devices across a network. If the preset passive authentication time period has elapsed, in an embodiment, the method may proceed to block 416 for execution of a scheduled measurement of brainwaves. If the preset passive authentication time period has not elapsed, in an embodiment, the method may proceed to block 412, and the user's access to the information handling system of the head mounted display device may continue.

In an embodiment, at block 416, it may be determined whether brainwaves have been detected at the plurality of brainwave sensors mounted within the wearable headset of the head mounted display device. As described herein, the brainwave detection controller may measure the voltages across the plurality of brainwave detection sensors at routine intervals in order to detect when a user has doffed the head mounted display device. If the brainwave detection controller in an embodiment detects a presence of brainwave patterns at one of these routine intervals, the method may proceed back to block 412, and the user's access to the information handling system of the head mounted display device may continue uninterrupted. If the brainwave detection controller in an embodiment detects a lack of brainwave patterns at one of these routine intervals, this may indicate the user that was authenticated as an authorized user at block 408 has removed the headset, potentially allowing an unauthorized user access to the head mounted display device information handling system. In such a scenario, the head-mounted display secure session maintenance system may prompt the CPU to end the user session, and the method may return to block 402 or 404 upon no brainwaves being detected at 416 such that a new user session must occur at 402. Returning to 402 or 404 includes either of two embodiment variations. An optional donning signal may be received at 402 in some example embodiments. In others a cyclical detection of brainwaves may recheck the head mounted display device brain wave detection system for brainwave detection. In either embodiment, the system then may recheck for brainwave detection at 404 to re-initiate access or denial of access to the head mounted display device as with embodiments described herein. In such a way, the head-mounted display secure session maintenance system in an embodiment may only allow initiation of new user sessions following re-authentication of the user requesting the user session. In some embodiments, the flow may instead proceed back to block 408, rather than 402 or 404, for initiation of another primary authentication method upon detection of additional brainwaves.

In other embodiments, the brainwave detection controller may measure the voltages across the plurality of brainwave detection sensors continuously following the initiation of a user session. In such embodiments, if the brainwave detection controller consistently detects the presence of brainwave patterns, the method may proceed to block 412. If the brainwave detection controller in an embodiment detects a cessation of brainwave patterns during such a continuous monitoring period, this may indicate the user that was authenticated as an authorized user at block 408 has doffed the headset, potentially allowing an unauthorized user access to the head mounted display device information handling system. In such a scenario, the head-mounted display secure session maintenance system may prompt the CPU to end the user session, and the method may proceed back to block 402, 404 or 408 for initiation of another primary authentication method. In such a way, the head-mounted display secure session maintenance system in an embodiment may only allow initiation of new user sessions following re-authentication of the user requesting the user session.

In still other embodiments, the brainwave detection controller may measure the voltages across the plurality of brainwave detection sensors either continuously, or for a brief period at the end of a routine interval, in order to detect the type of brainwave pattern exhibited by the user. If the brainwave detection controller in such an embodiment detects an alpha, delta, or theta brainwave pattern at such a point, this may indicate the user is no longer in a wakeful state. In such a scenario, the head-mounted display secure session maintenance system may prompt the CPU to end the user session, and the method may proceed back to any of block 402, 404, or 408 for initiation of another primary authentication method in accordance with embodiments herein. In such a way, the head-mounted display secure session maintenance system in an embodiment may only allow initiation of new user sessions following re-authentication of the user requesting the user session.

Figure 5:
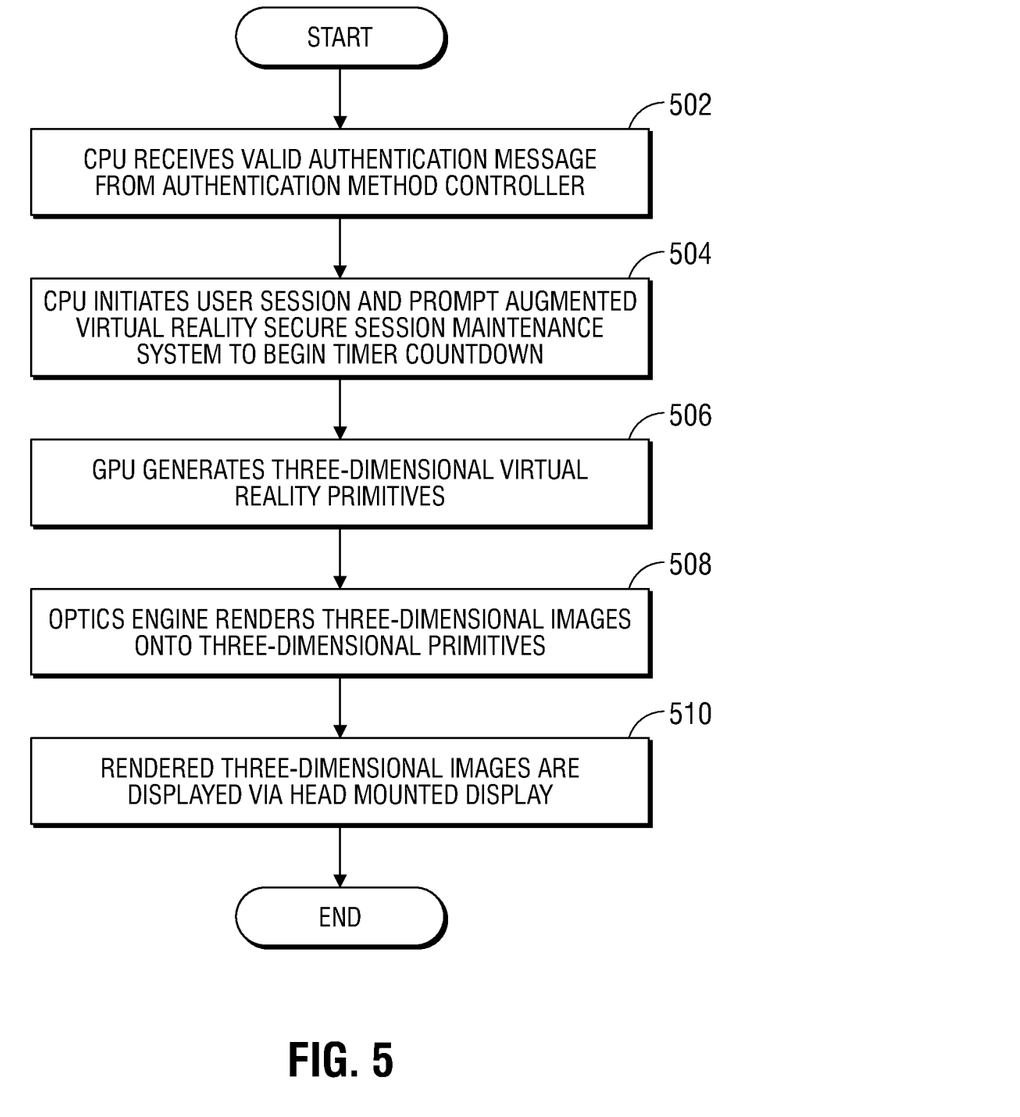
FIG. 5 is a flow diagram of a method for displaying digital information to an authorized user via a head mounted display device according to an embodiment of the present disclosure.

FIG. 5 is a flow diagram of a method for displaying digital information to a user identified by an authentication method controller as an authorized user via a head mounted display device according to an embodiment of the present disclosure. As described herein, an authentication method controller in an embodiment may operate to receive input from security sensors such as, for example, a microphone, a keyboard or other manual input device, a retinal scanner, an iris scanner, or a fingerprint scanner in order to determine if a user requesting a new user session is a valid, authorized user. At block 502, in an embodiment, the CPU of a head mounted display device information handling system may receive a valid authentication message from the authentication method controller. The authentication method controller in an embodiment may receive an input from the keyboard or other manual input device, and compare it against usernames and/or passwords, voice recordings of authorized users, or retinal, iris, or fingerprint scans of authorized users. If the received input matches one of the authorized passwords, voice recordings of authorized users, or retinal, iris, or fingerprint scans of authorized users, the authentication method controller may transmit such a valid authentication message.

Once the user requesting initiation of the new user session has been authenticated by the authentication method controller, the CPU at block 504 in an embodiment may initiate the requested new user session and prompt the head-mounted display secure session maintenance system to begin a timer countdown. As described herein, in some embodiments, the brainwave detection controller may measure the voltages across the plurality of brainwave detection sensors at routine intervals in order to detect when a user has doffed the head mounted display device. These preset routine intervals may occur at the terminus of the countdown timer prompted by the CPU at block 504. Further, once the user requesting the new session has been verified as an authorized user by the authentication method controller in an embodiment, the CPU may grant the user access to the information handling system of the head mounted display device, and direct the GPU, optics engine, and head mounted display of the head mounted display device to display information via the head mounted display.

At block 506, in an embodiment, the GPU of the head mounted display device information handling system may generate one or more three-dimensional virtual reality primitives. For example, the GPU in an embodiment may operate to generate three-dimensional primitives within a virtual three-dimensional environment of digital content to be displayed within the head mounted display. Such three-dimensional primitives may dictate the location and orientation of one or more three-dimensional images with respect to the head mounted display device within such a three-dimensional virtual environment. In other embodiments, the primitives generated may be two-dimensional.

The optics engine of the head mounted display device information handling system in an embodiment may render three-dimensional images onto the three dimensional primitives at block 508. An optics engine of the head mounted display device may render three-dimensional images of the digital content onto such three-dimensional primitives in an embodiment. In such a way, the digital content may be viewed in a three-dimensional environment in which the digital content is placed at the position and at the orientation dictated by the three-dimensional primitives generated by the GPU. In other embodiments, primitives may be two-dimensional, and the images rendered onto the primitives may also be two-dimensional.

At block 510, the rendered three-dimensional images (or two-dimensional images) are displayed via the head mounted display. In an embodiment, once the three-dimensional images, or two-dimensional images have been rendered at block 508, the rendered three-dimensional or two-dimensional images may then be displayed by the head mounted display using, for example, a curved mirror based reflection, a waveguide based method or a light guide based method. Waveguide methods may further include, but may not be limited to diffraction optics, holographic optics, polarized optics, and reflective optics. The method may then end. In such a way, the head-mounted display secure session maintenance system in an embodiment may allow authorized users donning the wearable headset access to digital content of the head mounted display device information handling system projected via the head mounted display.

The blocks of the flow diagrams of FIGS. 4-5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an head-mounted display secure session maintenance system comprising:
    a head mounted display device mounted within a wearable headset;
    a plurality of brain wave detection sensor mounted within the wearable headset such that the plurality of brain wave detection sensors make contact with a wearer's scalp upon placement of the wearable headset on the wearer's head;
    a processor receiving a user input positively identifying the user as an authenticated user;
    a brain wave detection controller measuring a first difference in voltage across the plurality of brain wave detection sensors;
    the brain wave detection controller measuring a first brain wave pattern signal across the plurality of brain wave detection sensors if the first difference in voltage across the plurality of brain wave detection sensors meets or exceeds five microvolts; and
    a head mounted display of the head mounted display device displaying three-dimensional images of data content if the measured first brain wave pattern signal is identified as a brain wave pattern.

2. The information handling system of claim 1 further comprising:
    the brain wave detection controller measuring a second difference in voltage across the plurality of brain wave detection sensors after a preset time period elapses; and
    the head mounted display of the head mounted display device ceasing display of three-dimensional images of data content if the measurement of the second difference in voltage across the plurality of brain wave detection sensors does not meet or exceed five microvolts.

3. The information handling system of claim 1, wherein the identified brain wave pattern is a beta brain wave pattern that is a sinusoidal signal having a frequency between 13 and 30 Hz.

4. The information handling system of claim 1, wherein the identified brain wave pattern is a beta brain wave pattern that is a sinusoidal signal having an amplitude between five and ten microvolts.

5. The information handling system of claim 1 further comprising:
    the head mounted display displaying a message that the user has been denied access to the head mounted display if the measurement of the first difference in voltage across the plurality of brain wave detection sensors does not meet the preset voltage difference threshold.

6. The information handling system of claim 1, wherein the user input positively identifying the user as an authenticated user is an iris scan.

7. The information handling system of claim 1, wherein the user input positively identifying the user as an authenticated user is a fingerprint scan.

8. A method of routing the display of secure content to a head mounted display device via a host information handling system comprising:
    measuring, via a brain wave detection controller, a first difference in voltage across a plurality of brain wave detection sensors mounted with a head mounted display device;
    measuring, via the brain wave detection controller, a first brain wave pattern signal across the plurality of brain wave detection sensors if the first difference in voltage across the plurality of brain wave detection sensors meets or exceeds five microvolts;
    if the first brain wave pattern signal is identified as a beta brain wave pattern, prompting the user for valid user credentials via a processor;
    receiving, via the processor, user credentials from the user; and
    if the user credentials match credential records stored in a memory associated with an authenticated user, granting the user access to the head mounted display device.

9. The method of claim 8 further comprising:
    continuously measuring a second brain wave pattern signal across the plurality of brain wave detection sensors via the brain wave detection controller after granting the user access to the head mounted display device; and
    ceasing display of three-dimensional images of data content via a head mounted display of the head mounted display device if the second brain wave pattern signal is not the beta brain wave pattern.

10. The method of claim 9, wherein the beta brain wave pattern is a sinusoidal signal having a frequency between 13 and 30 Hz.

11. The method of claim 9, wherein the beta brain wave pattern is a sinusoidal signal having an amplitude between five and ten microvolts.

12. The method of claim 8 further comprising:
    denying the user access to the head mounted display device if the user credentials do not match credential records stored in a memory associated with an authenticated user.

13. The method of claim 8, wherein the user credentials include a correct password.

14. The method of claim 8, wherein the user credentials include a retinal scan.

15. An information handling system operating an head-mounted display secure session maintenance system comprising:

a head mounted display device mounted within a wearable headset;
a plurality of brain wave detection sensor mounted within the wearable headset such that the plurality of brain wave detection sensors make contact with a wearer's scalp upon placement of the wearable headset on the wearer's head;
a processor receiving a user input positively identifying the user as an authenticated user;
a brain wave detection controller measuring a first difference in voltage across the plurality of brain wave detection sensors;
the brain wave detection controller measuring a first brain wave pattern signal across the plurality of brain wave detection sensors if the first difference in voltage across the plurality of brain wave detection sensors meets or exceeds five microvolts;
a head mounted display of the head mounted display device displaying three-dimensional images of data content if the first brain wave pattern signal is identified as a brain wave pattern; and
the head mounted display denying the user access to the head mounted display if the first brain wave pattern is not identified as the brain wave pattern.

16. The information handling system of claim 1 further comprising:

the brain wave detection controller continuously measuring a second brain wave pattern signal across the plurality of brain wave detection sensors via the brain wave detection controller after granting the user access to the head mounted display device; and
the head mounted display of the head mounted display device ceasing display of three-dimensional images of data content via a head mounted display of the head mounted display device if the second brain wave pattern signal is not the brain wave pattern.

17. The information handling system of claim 15, wherein the brain wave pattern is a beta brain wave pattern that is a sinusoidal signal having a frequency between 13 and 30 Hz.

18. The information handling system of claim 15, wherein the brain wave pattern is a beta brain wave pattern that is a sinusoidal signal having an amplitude between five and ten microvolts.

19. The information handling system of claim 15, wherein the user input positively identifying the user as an authenticated user is an iris scan.

20. The information handling system of claim 15, wherein the user input positively identifying the user as an authenticated user is a fingerprint scan.

* * * * *